(12) United States Patent
Moon et al.

(10) Patent No.: US 10,834,545 B2
(45) Date of Patent: Nov. 10, 2020

(54) GROUP COMMUNICATION SERVICE PROVIDING METHOD, SYSTEM AND COMPUTER-READABLE MEDIUM

(71) Applicant: SEESAWTALK Inc., Seoul (KR)

(72) Inventors: Jae Ho Moon, Hwaseong-si (KR); Sung Hee Cheng, Goyang-si (KR)

(73) Assignee: SEESAWTALK Inc., Seoul (KR)

( * ) Notice: Subject to any disclaimer, the term of this patent is extended or adjusted under 35 U.S.C. 154(b) by 0 days.

(21) Appl. No.: 16/705,856

(22) Filed: Dec. 6, 2019

(65) Prior Publication Data
US 2020/0245104 A1 Jul. 30, 2020

(30) Foreign Application Priority Data
Jan. 30, 2019 (KR) .......................... 10-2019-001220

(51) Int. Cl.
| | | |
|---|---|---|
| H04M 3/42 | (2006.01) | |
| H04W 4/08 | (2009.01) | |
| H04W 4/14 | (2009.01) | |
| H04W 12/06 | (2009.01) | |
| H04L 29/08 | (2006.01) | |
| H04L 29/12 | (2006.01) | |

(52) U.S. Cl.
CPC ............... *H04W 4/08* (2013.01); *H04L 67/26* (2013.01); *H04W 4/14* (2013.01); *H04W 12/06* (2013.01); *H04L 61/304* (2013.01)

(58) Field of Classification Search
CPC ......... H04W 4/08; H04W 12/06; H04W 4/14; H04L 67/26; H04L 61/304
USPC ....................................................... 455/414.1
See application file for complete search history.

(56) References Cited

U.S. PATENT DOCUMENTS

| | | | | |
|---|---|---|---|---|
| 8,554,195 B2* | 10/2013 | Rao | ........................ | G06Q 10/10 |
| | | | | 455/420 |
| 8,630,206 B2* | 1/2014 | Horio | .................. | H04L 65/4038 |
| | | | | 370/254 |
| 8,762,460 B2* | 6/2014 | Lindner | .............. | H04L 12/1822 |
| | | | | 709/204 |
| 8,892,747 B2* | 11/2014 | Laumen | .................. | H04W 4/08 |
| | | | | 709/227 |
| 9,065,579 B2* | 6/2015 | Turcanu | ................ | H04W 8/186 |
| 9,154,924 B2* | 10/2015 | Westman | .............. | H04W 8/186 |
| 10,004,095 B2* | 6/2018 | Jung | ..................... | H04W 8/005 |
| 2002/0087646 A1* | 7/2002 | Hickey | .................. | G06Q 10/10 |
| | | | | 709/206 |

(Continued)

*Primary Examiner* — Amancio Gonzalez
(74) *Attorney, Agent, or Firm* — Studebaker & Brackett PC

(57) ABSTRACT

Provided is a method for providing a group communication service performed in a service server for performing data communication with a manager terminal and a user terminal. The method comprises a first group setting step of setting a first group by providing an interface for receiving group member information from a manager terminal and setting a member classification item, a second group setting step of setting a second group by providing an interface for providing a clustered information on the basis of the member classification item based on information on the first group and receiving a manager input for the clustered information and a message sending step of receiving message information sent according to an input of a manager terminal and sending a message to a user terminal belonging to the second group.

13 Claims, 18 Drawing Sheets

(56) References Cited

U.S. PATENT DOCUMENTS

| | | | |
|---|---|---|---|
| 2012/0072234 A1* | 3/2012 | Rao | G06F 19/3418 |
| | | | 705/2 |
| 2013/0252656 A1* | 9/2013 | Lee | H04W 76/14 |
| | | | 455/519 |
| 2013/0317859 A1* | 11/2013 | Rao | H04L 12/185 |
| | | | 705/3 |
| 2019/0230481 A1* | 7/2019 | Yang | H04W 4/02 |
| 2019/0245843 A1* | 8/2019 | Ja | H04L 63/0815 |
| 2019/0261379 A1* | 8/2019 | Yerramalli | H04W 4/08 |
| 2020/0092685 A1* | 3/2020 | Fehrenbach | H04B 7/15507 |

\* cited by examiner

FIG. 5

| | | | | | SETTING |
|---|---|---|---|---|---|
| GROUP MANAGEMENT | SEESAW MANAGEMENT | CALLING NUMBER MANAGEMENT | SMS MANAGEMENT | | |

| MJCT | | SEARCH MEMBER | ADD MEMBER | UPLOAD CVS FILE | EDIT | DELETE |
|---|---|---|---|---|---|---|
| | | | | | | MEMBER:0 |

SEE.SAW  SEARCH 🔍     🔔

MJCT

| PHONE NUMBER | NAME | DEPARTMENT | POSITION | GENDER |
|---|---|---|---|---|
| 01012345678 | NAME1 | SERVICE OPERATION | TEAM LEADER | MALE |
| 01010002000 | NAME2 | CUSTOMER MANAGEMENT TEAM | TEAM LEADER | MALE |
| 01010002001 | NAME3 | CUSTOMER MANAGEMENT TEAM | EMPLOYEE | FEMALE |
| 01010002002 | NAME4 | CUSTOMER MANAGEMENT TEAM | EMPLOYEE | MALE |
| 01010002003 | NAME5 | CUSTOMER MANAGEMENT TEAM | EMPLOYEE | FEMALE |
| 01010002005 | NAME6 | CUSTOMER MANAGEMENT TEAM | EMPLOYEE | MALE |
| 01010002005 | NAME7 | CUSTOMER MANAGEMENT TEAM | EMPLOYEE | FEMALE |
| 01010002006 | NAME8 | CUSTOMER MANAGEMENT TEAM | EMPLOYEE | MALE |
| 01010002007 | NAME9 | CUSTOMER MANAGEMENT TEAM | EMPLOYEE | FEMALE |
| 01010002008 | NAME10 | CUSTOMER MANAGEMENT TEAM | EMPLOYEE | MALE |

☐ DELETE EXISTING MEMBER DATA  [SAVE]

[NEW]

SEE.SAW

| GROUP MANAGEMENT | SEESAW MANAGEMENT | CALLING NUMBER MANAGEMENT | SMS MANAGEMENT | SETTING |

CREATE SEESAW

1. SEESAW NAME

MJCT KOREA

2. SELECT GROUP

⦿ MJCT  ○ SEESAW  ○ CS

3. SEESAW MEMBER

○ ALL  ⦿ SELECT

ADD MEMBER

4. WRITING PERMISSION

⦿ ALL  ○ SELECT

5. MANAGER

ADD MEMBER

6. SELECT CALLING NUMBER

○

NEW

FIG. 9

SEE.SAW    SEARCH

GROUP MANAGEMENT | SEESAW MANAGEMENT | CALLING NUMBER MANAGEMENT | SMS MANAGEMENT    SETTING

CREATE SEESAW

SEARCH MEMBER

1. SEESAW NAME
MJCT KOR

2. SELECT GROUP
⦿ MJCT

3. SEESAW MEMBER
○ ALL
[ADD MEMBER]

4. WRITING PERMIS
⦿ ALL

5. MANAGER
[ADD MEMBER]

6. SELECT CALLING
○

[NEW]

DEPARTMENT
☐ GUIDE OPEARTION TEAM   ☐ MANAGEMENT   ☐ CUSTOMER MANAGEMENT TEAM
☑ PURCHASING TEAM   ☑ SERVICE PLANNING TEAM   ☐ SERVICE OPERATION
☐ SALES TEAM 1   ☐ SALES TEAM 2   ☐ RESERVATION MANAGEMENT TEAM
☐ TRANSPORTATION MANAGEMENT TEAM   ☐ MATERIAL TEAM   ☑ COMPUTER TEAM
☐ ACCOUNTING TEAM

POSITION
☐ REPRESENTATIVE   ☑ EMPLOYEE   ☐ TEAM LEADER

GENDER
☐ MALE   ☐ FEMALE

[ADD RECEIVING CONDITION]

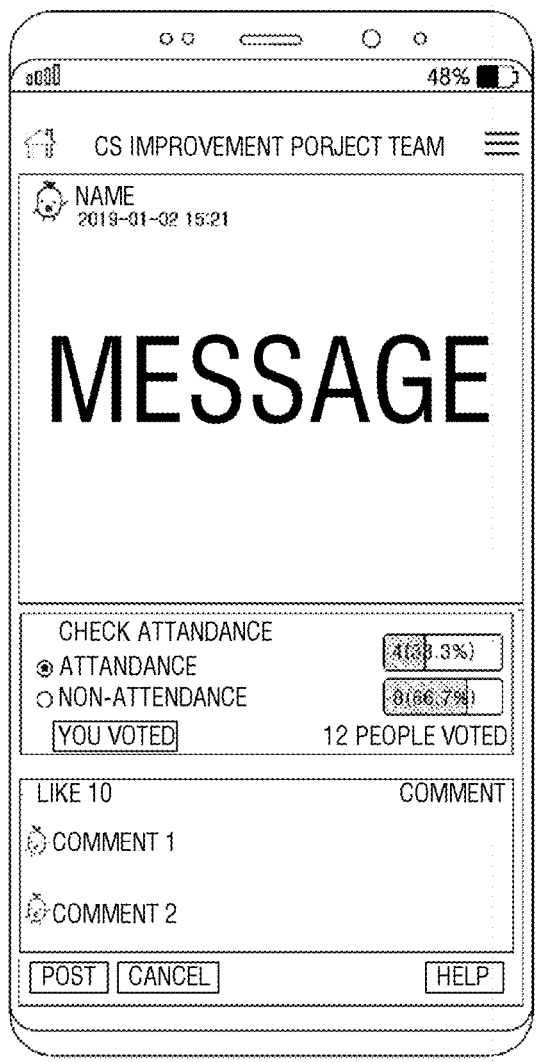
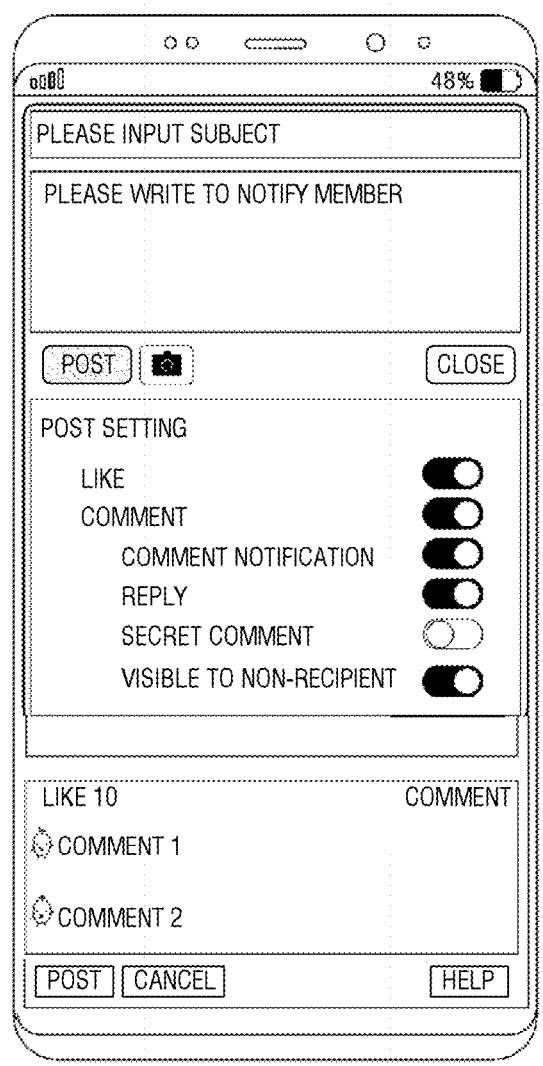
FIG. 18A  FIG. 18B

GROUP COMMUNICATION SERVICE PROVIDING METHOD, SYSTEM AND COMPUTER-READABLE MEDIUM

This application claims the benefit of Korean Patent Application No. 10-2019-0012200 filed on Jan. 30, 2019, in the Korean Intellectual Property Office, the disclosure of which is incorporated herein by reference in its entirety.

BACKGROUND

1. Field

The present disclosure relates to a method, a system and a computer-readable medium for providing a group communication service, and more particularly, which can be used without a separate membership, enables a manager to efficiently manage a large group of employees by grouping large information, and selectively sends a message to be delivered by an SMS or a push notification of a dedicated application.

2. Description of the Related Art

In modern society, there are various groups and organizations, such as universities, companies and clubs, and as the size of the group grows, group managers have difficulty in communicating with members of the group. Messenger services, such as SNS, KakaoTalk, and LINE, which are commonly used in modern society, are easily used for individual communication, but even if the number of group members is over 300, it is difficult to communicate with all members with such messenger services from the point of view of a group manager.

Meanwhile, in addition to the messenger services, services such as meeting applications that can notify a large number of people, such as Band, are commercially available. However, since it is necessary for all the members of the group to install the application or sign up for membership in this service, if a group member, who thinks the service is annoying, does not sign up for membership or does not install the application, even if the group manager notifies, the group member is often unable to check the notification. Further, when attempting to communicate by text via an SMS, a probability that group members receive and confirm a message increases, but it is not efficient in terms of cost, and it is also difficult to receive feedback from group members.

As mentioned above, the larger the group, the more it is necessary for a manager to convey a notice to all group members, require feedback from the members, distinguish the group into sub-groups according to their characteristics and convey a notice to each sub-group. However, there is no prior art that provides such a group communication service.

The present inventive concept relates to a method, a system and a computer-readable medium for providing a group communication service, which can be used without a separate membership, enables a manager to efficiently manage a large group of employees by grouping large information, and selectively sends a message to be delivered by an SMS or a push notification of a dedicated application.

SUMMARY

According to an embodiment of the present inventive concept, even if a manger or a user does not have a membership in a service server, the manager or the user can log in with a phone number of his or her user terminal to use the service.

According to an embodiment of the present inventive concept, a manager can easily register a large group in a service server and divide the registered group into sub-groups by his or her desired criteria.

According to an embodiment of the present inventive concept, a manager can transmit a message to be delivered by a push notification or an SMS to each subdivided group, and can flexibly set the details of a message to be delivered.

According to an embodiment of the present inventive concept, when a user downloads a dedicated application to his or her user terminal, the user may receive a message by a push notification, or receive a message through an SMS without necessarily downloading the dedicated application.

According to an embodiment of the present inventive concept, a manager and a user can set a desired widget according to the purpose or the need thereof.

BRIEF DESCRIPTION OF THE DRAWINGS

These and/or other aspects will become apparent and more readily appreciated from the following description of the embodiments, taken in conjunction with the accompanying drawings in which:

FIG. 5 schematically illustrates a display screen of a manager terminal according to the performing of a first group setting unit according to an embodiment of the present inventive concept.

FIG. 6 schematically illustrates a display screen of a manager terminal according to the performing of a first group setting unit according to an embodiment of the present inventive concept.

FIG. 8 schematically illustrates a display screen of a manager terminal according to the performing of a second group setting unit according to an embodiment of the present inventive concept.

FIG. 9 schematically illustrates a display screen of a manager terminal according to the performing of a second group setting unit according to an embodiment of the present inventive concept.

FIGS. 18A and 18B schematically illustrate a display screen of a user terminal connected to a service server according to an embodiment of the present inventive concept.

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise". "include". "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1:
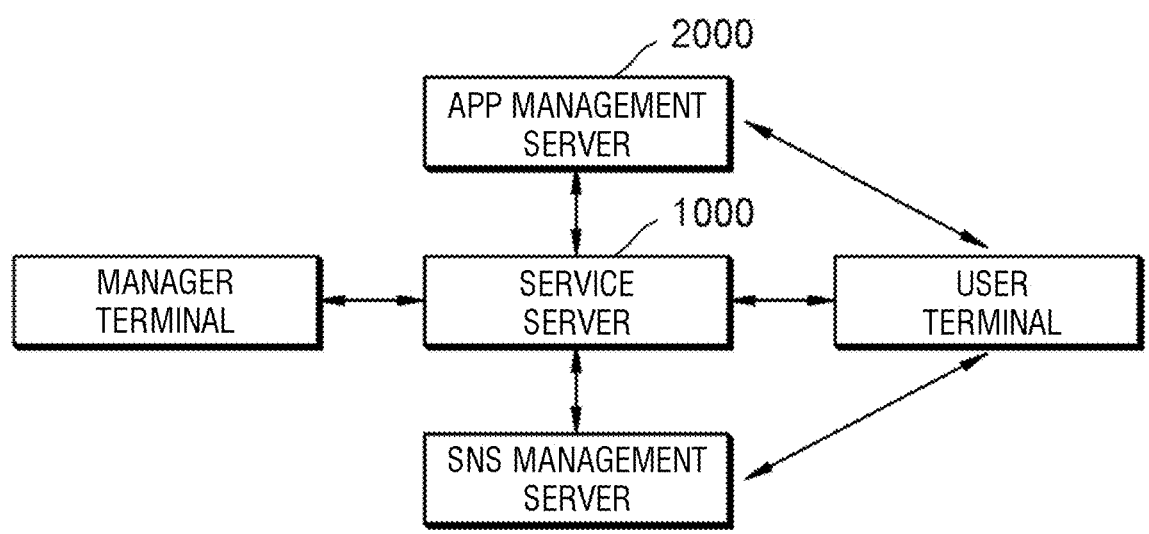
FIG. 1 schematically illustrates an overall system type of a method for providing a group communication service according to an embodiment of the present inventive concept.

FIG. 1 schematically illustrates an overall system type of a method for providing a group communication service according to an embodiment of the present inventive concept.

A manager terminal or a user terminal of FIG. 1 may correspond to the user terminal described above, and a service server 1000 corresponds to a computing device including one or more processors and one or more memories.

The manager terminal and the user terminal may access the service server 1000 through a web browser program or through a dedicated application.

The manager terminal and the user terminal may use a service of the service server 1000 by logging in to the service server 1000 with a user's respective telephone number.

The manager terminal and the user terminal may log in to the service server 1000 using a different type of account, for example, a manager type account or a user type account. Hereinafter, a configuration of the service server 1000 will be described in more detail.

Figure 2:
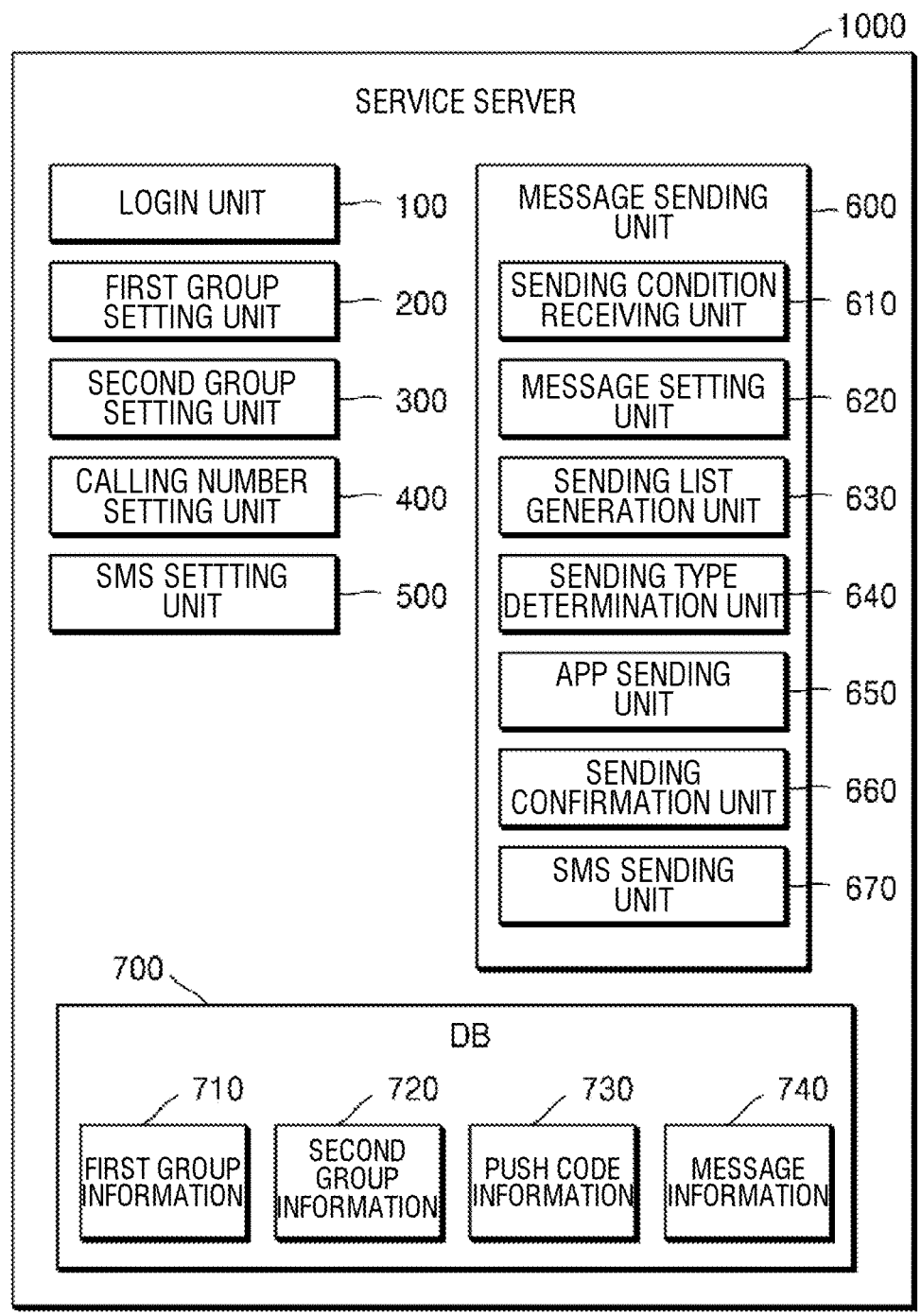
FIG. 2 schematically illustrates an internal configuration of a service server according to an embodiment of the present inventive concept.

FIG. 2 schematically illustrates an internal configuration of a service server 1000 according to an embodiment of the present inventive concept.

The service server 1000 of the present inventive concept may provide a group communication service. In general, a manager terminal and one or more user terminals can perform group communication by receiving message information from the manager terminal and sending a message so that the user terminal can check it with a SMS or a dedicated application.

The service server 1000 may include a login unit 100, a first group setting unit 200, a second group setting unit 300, a calling number setting unit 400, an SMS setting unit 500, a message sending unit 600, and DB 700.

The login unit 100 performs a login procedure of a corresponding user by accessing a web browser or a dedicated application from a manager terminal or a user terminal.

Preferably, in the case of a login of a manager terminal, the login procedure is performed by receiving a telephone number of the manager terminal, generating an authentication number from the telephone number and sending it to the telephone number, and determining whether a number received from the manager terminal is the same as the authentication number. Preferably, in the case of a login of a user terminal, the login procedure is performed by authenticating a device through the dedicated application.

As described above, the manager terminal and the user terminal do not need a separate complicated membership procedure, and a service of the service server 1000 can be easily used by logging in to the service server 1000 with authentication through a phone number in case of a manager or device authentication through installation of the dedicated application in case of a user. That is, according to some embodiments, the user terminal can check the message with a dedicated application merely by installing the dedicated application for the group communication service even if the user server is not a member of the service server. This convenience provides an effect that enables a manager to easily and powerfully propagate a notification message to a plurality of group members. That is, the manager can propagate a notification to group members merely by taking the group members to install the dedicated application.

The first group setting unit 200 sets a first group by providing an interface for receiving group member information from a manager terminal and setting a member classification item.

Preferably, the member classification item includes a telephone number, a name, a department, a position, a major, a grade, a region, a gender and a classification as an item for classifying information on the group member when setting a group member to belong to a first group, and can be further set by directly inputting member classification items directly determined by the manager into a user-specified input field when the manager wants to add the member classification items.

Specifically, the first group setting unit 200, after setting the member classification item, receives information on a group member from a manager terminal to generate first group information and stores the generated first group information in a DB 700.

The second group setting unit 300 sets a second group by providing an interface for providing clustered information on the basis of the member classification item based on the information on the first group, and for receiving a manager input thereof.

Specifically, the second group setting unit 300 receives a selection input for one or more of the first group and a selection input for the member classification item of a second group, which the manager wants to set, generates a second group information based on information clustered on the basis of the received member classification item, and store the generated second group information in the DB 700.

The calling number setting unit 400 performs a procedure of registering a phone number, which is used when sending an SMS in a message setting unit 620 to be described later, as a calling number. The phone number registered as the calling number set by the calling number setting unit 400 is used as a calling number to be displayed to receive a selection input from a manager terminal when the second group setting unit 300 sets a calling number selection item.

The SMS setting unit 500 provides a manager terminal with an interface for charging a necessary amount when sending an SMS to the user terminal and an interface for checking information on the used SMS.

The message sending unit 600 may receive message information including at least one of a message text and an attached image to be sent according to an input of the manager terminal, and send a message to a user terminal belonging to the second group. Specifically, the message sending unit 600 may send the received message information to a user terminal with any one of a push notification through a dedicated application or an SMS.

The message sending unit 600 includes a sending condition receiving unit 610; a message setting unit 620; a sending list generation unit 630; a sending type determination unit 640; an APP sending unit 650; a sending confirmation unit 660; and an SMS sending unit 670.

The sending condition receiving unit 610 receives a group member condition for sending the message among the one or more second groups from a manager terminal. The message setting unit 620 receives the message information from the manager terminal and displays a screen including the message information in the manager terminal. Specifically, the screen displayed by the message setting unit 620 includes a screen displaying an element that can be set by receiving message information including at least one of a message text and an attachment image to be transmitted from the manager terminal to the user terminal and a screen for displaying the message sent to the user terminal along with one or more previously sent messages in the manager terminal.

The sending list generation unit 630 generates a sending list based on a group member condition for sending the received message information.

The sending type determination unit 640 determines a push notification through a dedicated application or an SMS as a sending type based on push code information for each user terminal stored in the service server 1000 and the sending list.

The APP sending unit 650 sends the message through the push notification directly or indirectly to the user terminal according to the determined sending type.

The sending confirmation unit 660 may receive an acknowledgment response that can confirm whether the user terminal has received the message, which is directly or indirectly sent through the push notification from the APP sending unit 650, to determine whether the message has been received by the user terminal, and determine the completion of the message receipt or further request the SMS sending unit 670 to send a message.

The SMS sending unit 670 sends the message directly or indirectly to the user terminal with the SMS according to the determined sending type. Further, it may additionally send a message with an SMS according to a request of the sending confirmation unit 660.

Meanwhile, the DB 700 of the service server 1000 may store the first group information received from the manager terminal, a second group information set based on a selection input for at least one of the first group information, massage information to be delivered by a manager and push code information for identifying a user terminal.

Specifically, the first group information may include a first group basic information, a member list of the first group, phone numbers of members of the first group, and member information according to member classification items.

The second group information may include a second group basic information, a member list of the second group, phone numbers of members of the second group, member information according to member classification items and permission of a user terminal in the second group granted by the manager terminal.

The message information includes a message text and an attached image, and may further include setting information on details of a message. The push code information may store a push code for identifying each user terminal when sending a message from the manager terminal to one or more user terminals belonging to the second group along with a phone number of the user terminal.

The service server 1000 shown in FIG. 2 may further include other components in addition to the illustrated components, but for the sake of convenience, only the components related to the method for providing a group communication service according to the embodiments of the present inventive concepts are shown.

Figure 3:
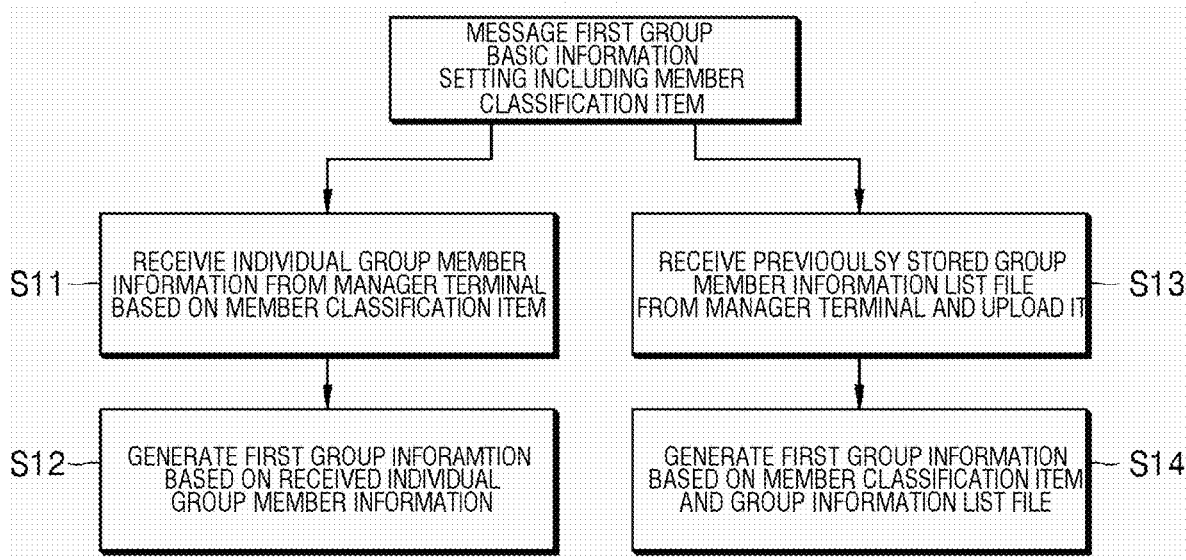
FIG. 3 schematically illustrates performing steps of a first group setting unit according to an embodiment of the present inventive concept.

FIG. 3 schematically illustrates performing steps of the first group setting unit 200 according to an embodiment of the present inventive concept.

After the execution of the login unit 100 is performed, a manger may receive an interface for setting a first group by clicking an icon on the upper right side of a screen (not shown) provided by the service server 1000, and then moving to an environment setting, or clicking on a seesaw creation item in order to set the first group.

The first group setting unit 200 performs step S10 of setting the first group basic information including the member classification item; step S13 of receiving a previously stored group member information list file from the manager terminal; and step S14 of generating the first group information based on the member classification item and the group member information list file.

Specifically, at step S10, the first group setting unit 200 sets first group basic information including the member classification item. The first group basic information includes a group name for setting a name of the first group, the member classification item, and an agreement to the terms and conditions requiring a manager's agreement to use a group communication service provided by the service server 1000. Preferably, the member classification item includes a phone number, name, department, position, major, grade, region, gender and classification, and may further include a user-specified member classification item when receiving the user-specified member classification item input from the manager terminal. The first group setting unit 200 receives the first group basic information from the manager terminal and sets the first group basic information.

At step S13, the first group setting unit 200 receives a previously stored group member information list file from the manager terminal. The manager should use a group member information list file of a large group managed by him or her, preferably in the form of CSV file. When the manager sends the group member information list file in the form of CVS file to the service server through the manager terminal, the first group setting unit 200 receives the group member information list file.

At step S14, the first group setting unit 200 generates first group information based on the group member information list file and the member classification item received from the manager terminal. Preferably, the member classification item field of the group member information list file should be the same as the member classification item set at step S10 in order to correctly generate the first group information.

Specifically, the first group information includes first group basic information, a member list of the first group, phone numbers of members of the first group, and member information according to member classification items.

Meanwhile, if there is no previously stored group member information list file in a manager terminal, the first group setting unit 200 may perform steps S11 and S12. Specifically, at step S11, the first group setting unit 200 receives individual group member information from a manager terminal based on the member classification item. When receiving a request for inputting individual group member information from a manager terminal, the first group setting unit 200 provides the manager terminal with an interface for inputting individual group member information based on the member classification item set at step S10 and receives individual group member information from the manager terminal.

At step S12, the first group setting unit 200 generates first group information based on the individual group member information received from the manager terminal. The first group information generated at steps S12 and S14 is stored in first group information of the DB 700 of the service server 1000.

When the service server 1000 for providing the group communication service receives data of a large group, even if data of 30,000 people, the service server 1000 can store data of 30,000 people in the first group information within 10 seconds, and thereby it enables a manager to effectively manage a large group.

Figure 4:
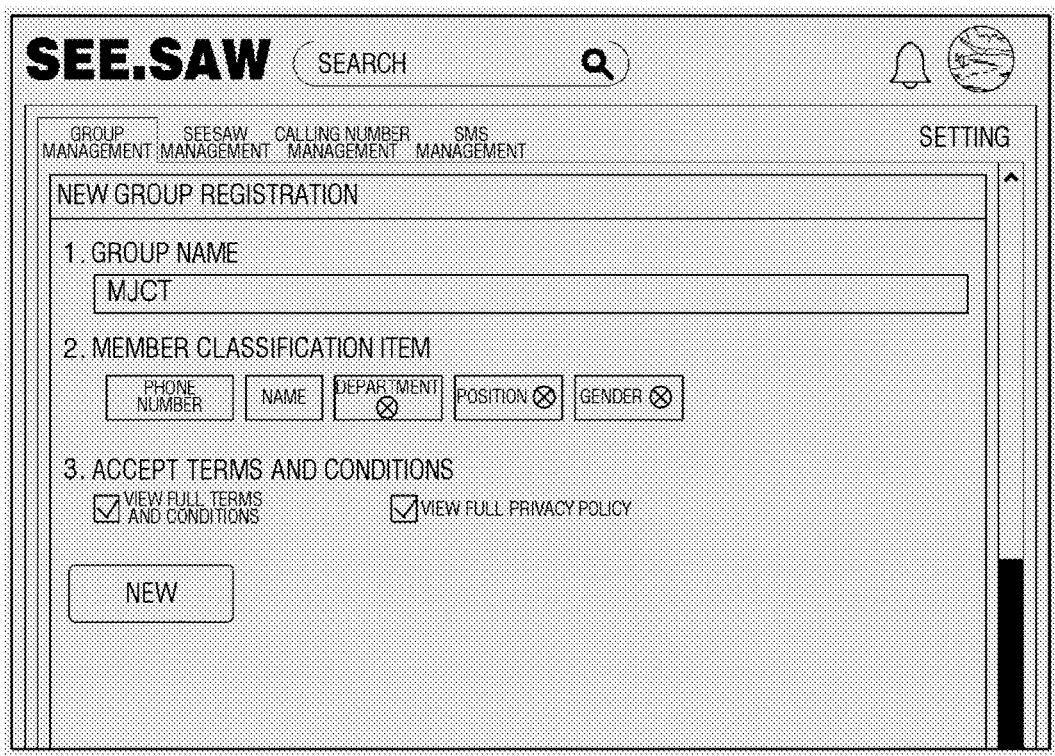
FIG. 4 schematically illustrates a display screen of a manager terminal according to the performing of a first group setting unit according to an embodiment of the present inventive concept.

FIG. 4 schematically illustrates a display screen of a manager terminal according to the performing of the first group setting unit 200 according to an embodiment of the present inventive concept.

Specifically. FIG. 4 corresponds to a screen, in which the first group setting unit 200 displays an interface for inputting the first group basic information into a manager terminal at step S10. As shown in FIG. 4, a group name inputting field for setting a name of the first group is displayed, and a manager may input a desired name of the first group. Further, the manager can add a member classification items or delete an added member classification item by clicking on member classification items in an item adding field, and if the manager wants to add other item other than the displayed member classification items, he or she can add a new member classification item by inputting his or her desired item in a user-specific field. After the manager sets the group name and the member classification item, when the manager agrees to the terms and conditions and the personal information processing policy and clicks the New button, the first group setting unit 200 sets the first group basic information.

FIG. 5 schematically illustrates a display screen of the manager terminal according to the performing of the first group setting unit 200 according to an embodiment of the present inventive concept.

Specifically, FIG. 5 corresponds to a screen, in which the first group setting unit 200 displays an interface for uploading a group member information list file previously stored in the manager terminal at steps S13 and S14. As shown in FIG. 5, a first group set by the first group basic information is displayed at step S10. Preferably, although the first group is illustrated as one MJCT in the screen illustrated in FIG. 5, the first group may be a plurality of lists based on the first group information inputted by the manager. The manager can upload a previously stored group member information list file of the large group managed by him or her by clicking the CSV file upload button to select the group member information list file to be inputted. When the group member information list file is uploaded, as shown in FIG. 5, the group member information list is displayed according to the member classification item set in the first group basic information, and the manager confirms whether the group member information list has been correctly generated to be consistent with the member classification item and clicks the Save button to have the first group setting unit 200 generate first group information.

Figure 6:
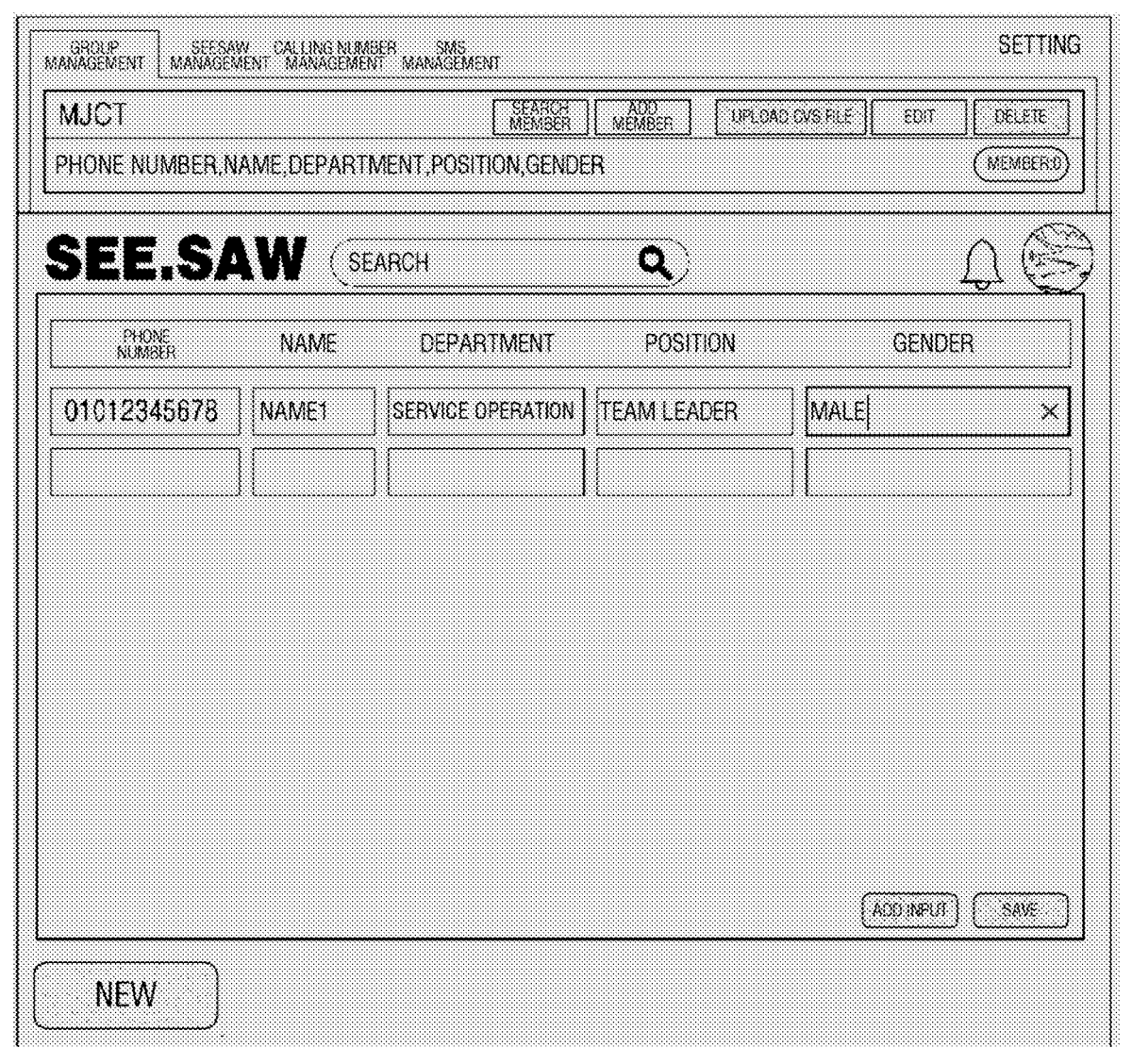

FIG. 6 schematically illustrates a display screen of a manager terminal according to the performing of the first group setting unit 200 according to an embodiment of the present inventive concept.

Specifically. FIG. 6 corresponds to a screen, in which the first group setting unit 200 displays an interface for inputting individual group member information into a manager terminal at steps S11 and S12. As shown in FIG. 6, at step S10, a first group set by the first group basic information is displayed. Preferably, although the first group is illustrated as one MJCT in the screen illustrated in FIG. 6, the first group may be a plurality of lists based on the first group information inputted by the manager. When the manager clicks the Add Member button to add individual group member information, as shown in FIG. 6, a screen for inputting information for each member classification item set in the first group basic information is displayed, and the manager can input individual group member information. If the Add Input button is clicked, more group member information can be inputted, and when clicking the Save button after inputting individual group member information, the first group setting unit 200 generates the first group information based on the individual group member information inputted by the manager.

Figure 7:
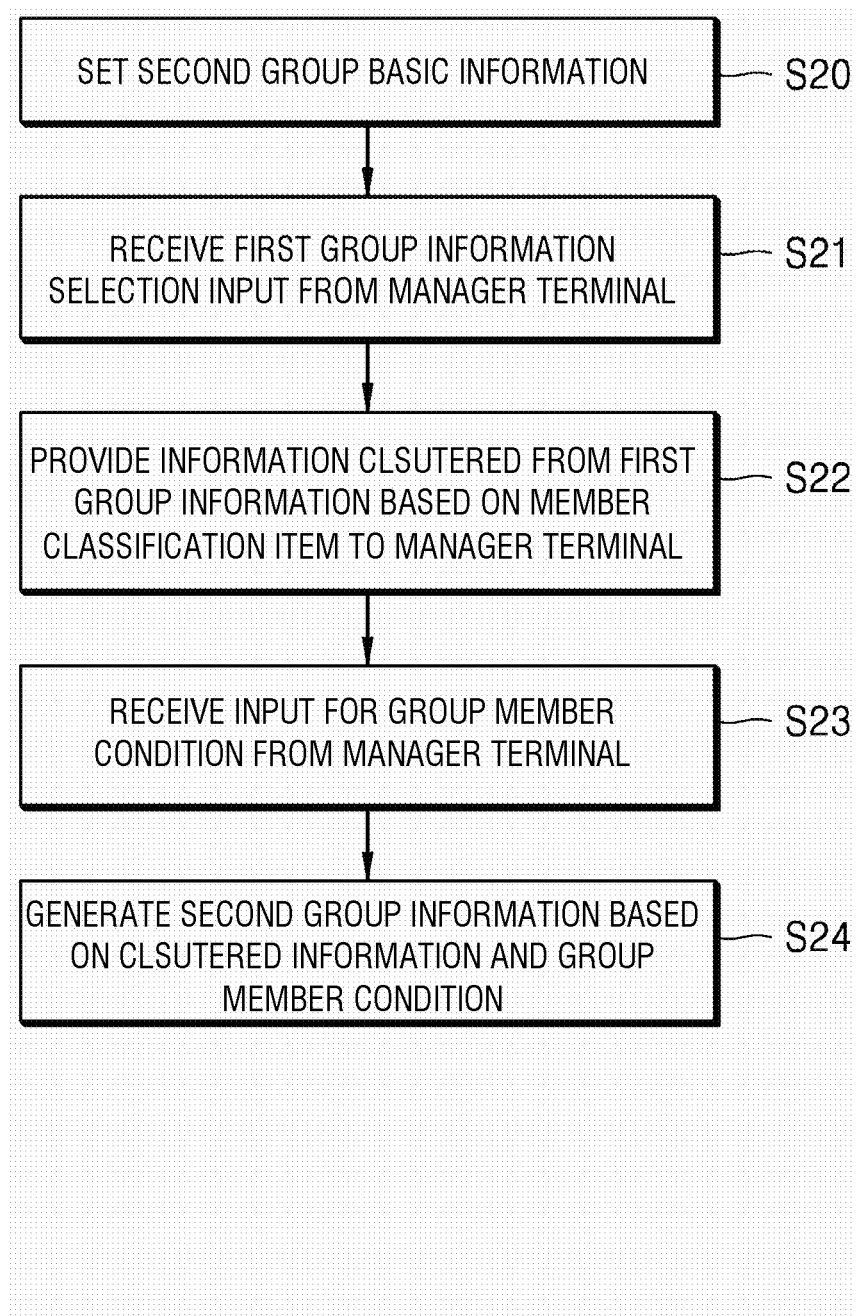
FIG. 7 schematically illustrates performing steps of a second group setting unit according to an embodiment of the present inventive concept.

FIG. 7 schematically illustrates performing steps of the second group setting unit 300 according to an embodiment of the present inventive concept.

After the performing of the first group setting unit 200, the manager can be provided with an interface for setting a second group, which sets the second group by clicking the Seesaw Management tab of the screen (not shown), in which the first group list is provided by the service server 1000.

The second group setting unit 300 performs step S20 of setting second group basic information; step S21 of receiving a selection input for at least one of at least one first group information from the manager terminal; step S22 of providing the first group information clustered based on the member classification item to the manager terminal; step S23 of receiving an input for a group member condition from the manager terminal; and step S24 of generating second group information based on the first group information and the group member condition.

Specifically, at step S20, the second group setting unit 300 sets second group basic information. The second group basic information includes a seesaw name for setting a name of the second group to be set, a writing permission for granting permission to write to a member belonging to the second group, a manager for setting a manger of the second group to be set and a calling number selection for setting a number of an manager terminal or a user terminal used when sending an SMS.

The second group setting unit 300 receives the second group basic information from the manager terminal and sets the second group basic information.

At step S21, the second group setting unit 300 receives a selection input for at least one of the at least one first group information from the manager terminal. The second group setting unit 300 displays one or more first group lists generated by the first group setting unit 200 in the manager terminal, and receives a selection input for one or more of the first group information list from the manager terminal.

At step S22, the second group setting unit 300 clusters the first group information selected according to the selection input received from the manager terminal based on the member classification item set by the first group setting unit 200, and provides the clustered information to the manager terminal.

At step S23, the second group setting unit 300 receives an input for a group member condition of belonging to the second group from the manager terminal provided with the clustered information.

At step S24, the second group setting unit 300 generates second group information based on the first group information and the group member condition. Preferably, at the step S23, when receiving an input for generating the group member information list of the first group information to the second group information without selecting the group member condition from the manager terminal, at step S24, the second group information may be generated to be the same as the selected first group information. The second group information generated at step S24 is stored in the second group information of the DB 700 of the service server 1000.

Preferably, the writing permission and the setting for the manager, like steps S22 and S23, provides the manger terminal with the selected first group information clustered based on the member classification item set in the first group setting unit 200, and the second group member having a writing permission and a manager's permission may be set by receiving an input for a group member condition of belonging to the second group from the manager terminal provided with the clustered information.

FIG. 8 schematically illustrates a display screen of a manager terminal according to the performing of the second group setting unit 300 according to an embodiment of the present inventive concept.

Specifically. FIG. 8 corresponds to a screen, in which the second group setting unit 300 displays an interface for inputting the second group basic information into a manager terminal at step S20. As shown in FIG. 8, a seesaw name input field for setting a name of the second group is displayed, and a manager may input a desired name of the second group. Further, a writing permission to grant permission to write to a member belonging to the second group, a manager to set the manager of the second group to be set, and a calling number selection to set a number of a manager terminal or an user terminal used when sending a SMS can be set in the screen shown in FIG. 8.

As shown in FIG. 8, at step S21, it corresponds that a screen displaying a list of one or more first group information generated by the first group setting unit 200 is provided to a manager terminal, and it is shown that a manager has selected a first group set with the name of MJCT among the one or more first groups in the provided screen.

For example, the first group set with the name of MJCT may be stored in the first group information of the DB 700 of the service server 1000 as shown in Table 1 below.

TABLE 1

| Phone Number | Name | Department | Position | Gender |
|---|---|---|---|---|
| 01012345678 | Eunbul Kim | GUIDE Operation Team | Team Leader | Female |
| 01010002001 | Miso Choi | GUIDE Operation Team | Employee | Female |
| 01010002002 | Sungmi Kim | Management | Team Leader | Female |
| 01010002003 | Junghun Kim | Management | Employee | Male |
| 01010002004 | Mansun Lee | Customer Management Team | Team Leader | Male |
| 01010002005 | Snagwhan Cho | Customer Management Team | Employee | Male |
| 01010002006 | Sunkwan Kang | Customer Management Team | Employee | Male |
| 01010002007 | Changho Lee | Customer Management Team | Employee | Male |
| 01010002008 | Yelin Park | Purchasing Team | Team Leader | Female |
| 01020001001 | Younghee Kim | Purchasing Team | Employee | Female |
| 01020001002 | Minji Kim | Purchasing Team | Employee | Female |
| 01020001003 | Kildong Hong | Purchasing Team | Employee | Male |
| 01020001004 | Gaeun Kim | Purchasing Team | Employee | Female |
| 01020001005 | Youngsu Park | Purchasing Team | Employee | Male |
| 01020001006 | Minsu Park | Purchasing Team | Employee | Male |
| 01020001007 | Sohee Kim | Service Planning Team | Team Leader | Female |
| 01020001008 | Gawon Park | Service Planning Team | Employee | Female |
| 01020001008 | Jinsil Choi | Service Planning Team | Employee | Female |
| 01020001009 | Bora Kang | Service Planning Team | Employee | Female |
| 01020001010 | Hyunkyung Park | Service Planning Team | Employee | Female |

TABLE 1-continued

| Phone Number | Name | Department | Position | Gender |
|---|---|---|---|---|
| 01020001011 | Donghyun Kim | Service Planning Team | Employee | Male |
| 01020001012 | Jinuk Cho | Computer Team | Employee | Male |
| 01020001013 | Jinhuk Kim | Computer Team | Employee | Male |
| 01020001014 | Yubin Kang | Computer Team | Employee | Female |
| 01020001015 | Jinyoung Choi | Sales Team 1 | Team Leader | Male |
| 01020001016 | Junghak Kim | Sales Team 2 | Team Leader | Male |
| 01020001017 | Miri Kim | Reservation Management Team | Employee | Female |
| 01020001018 | Jungsu Park | Material Team | Team Leader | Male |
| 01020001019 | Donghyun Yun | Material Team | Employee | Male |
| 01020001020 | Hanbyul Park | Accounting Team | Team Leader | Male |
| 01020001021 | Sanghun Kim | Accounting Team | Employee | Male |

After the manager selects the first group having the group name of MJCT, the display screen of the manager terminal for generating second group information according to the performing of the second group setting unit 300 will be described later with reference to FIG. 9.

FIG. 9 schematically illustrates a display screen of a manager terminal according to the performing of the second group setting unit 300 according to an embodiment of the present inventive concept.

Specifically, FIG. 9 corresponds to a screen, in which the second group setting unit 300 provides the manager terminal with the selected first group information clustered based on a member classification item at step S22. FIG. 9 illustrates a screen, in which when the manager selects a first group having the group name of MJCT among one or more first group names and clicks the Add member button at the seesaw member item, the first group member list is clustered for each department, position and representative, which is a member classification item preset by the first group setting unit 200 from the first group information having the group name of the MJCT, and provided to the manager terminal at step S21. Then, at step S22, the second group setting unit 300 receives a group member condition of belong to the second group from the manager terminal, and FIG. 9 illustrates a screen, in which the purchasing team, the service planning team and the computer team of Department item and the employee of Position item are selected as a group member condition based on the clustered information provided to the manager. Then, when the manager clicks the Add Receiving Condition button, the second group setting unit 300 may set a member of the second group based on the received group member condition.

For example, the second group setting unit 300 provides clustered information of the first group information having the group name of MJCT, and the second group generated based on the group member condition received from the manager terminal may be stored in the second group information of the service server as shown in Table 2.

TABLE 2

| Phone Number | Name | Department | Position | Gender |
|---|---|---|---|---|
| 01020001001 | Younghee Kim | Purchase Team | Employee | Female |
| 01020001002 | Minji Kim | Purchase Team | Employee | Female |
| 01020001003 | Kildong Hong | Purchase Team | Employee | Male |
| 01020001004 | Gaeun Kim | Purchase Team | Employee | Female |
| 01020001005 | Youngsu Park | Purchase Team | Employee | Male |

TABLE 2-continued

| Phone Number | Name | Department | Position | Gender |
|---|---|---|---|---|
| 01020001006 | Minsu Park | Purchase Team | Employee | Male |
| 01020001008 | Gawon Park | Service Planning Team | Employee | Female |
| 01020001008 | Jinsil Choi | Service Planning Team | Employee | Female |
| 01020001009 | Bora Kang | Service Planning Team | Employee | Female |
| 01020001010 | Hyunkyung Park | Service Planning Team | Employee | Female |
| 01020001011 | Donghyun Kim | Service Planning Team | Employee | Male |
| 01020001012 | Jinuk Cho | Computer Team | Employee | Male |
| 01020001013 | Jinhuk Kim | Computer Team | Employee | Male |
| 01020001014 | Yubin Kang | Computer Team | Employee | Female |

Table 2 shows, among the first group member list of Table 1, only the information of the group members received from the manager terminal, which is filtered by the purchasing team, the service planning team and the computing team of Department item and the employee information of Position item. Further, even when the manager clicks the Add member button of the writing permission item or clicks the Add member button of the manager item, as shown in FIG. 9, the second group setting unit 300 may provide the selected first group information clustered based on the member classification item to the manager terminal, and generate the second group information by receiving a selection input from the manger terminal.

Figure 10:
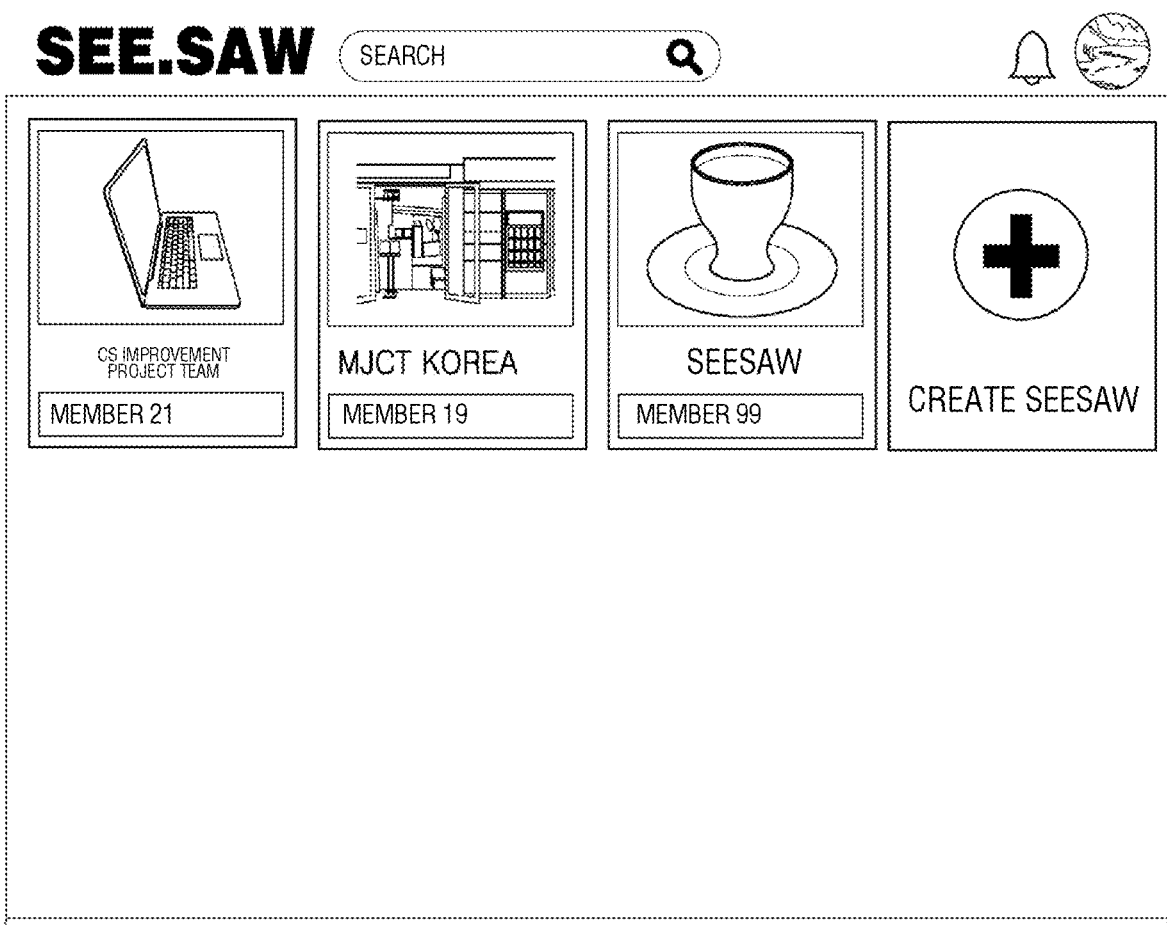
FIG. 10 schematically illustrates a display screen of a manager terminal according to the performing of a second group setting unit according to an embodiment of the present inventive concept.

FIG. 10 schematically illustrates a display screen of the manager terminal according to the performing of the second group setting unit 300 according to an embodiment of the present inventive concept.

Specifically, FIG. 10 corresponds to a screen, in which the second group setting unit 300 displays the second group in the manager terminal after generating the second group information. As shown in FIG. 10, one or more second groups generated by the second group setting unit 300 are displayed as shown in FIG. 10. Each second group displays a seesaw name, the number of second group members and a group display image based on the second group information set by the second group setting unit 300 through the manager terminal, and the Seesaw Creation item that can further create a second group is also displayed. When the manager clicks on the Seesaw Creation item through the manger terminal, which is provided with the screen of FIG. 10, a second group can be further created. When the desired second group is clicked, a message can be sent to members belonging to the corresponding second group. A detailed operation of sending a message to the user terminal belonging to the second group in the service server 1000 will be described later.

Figure 11:
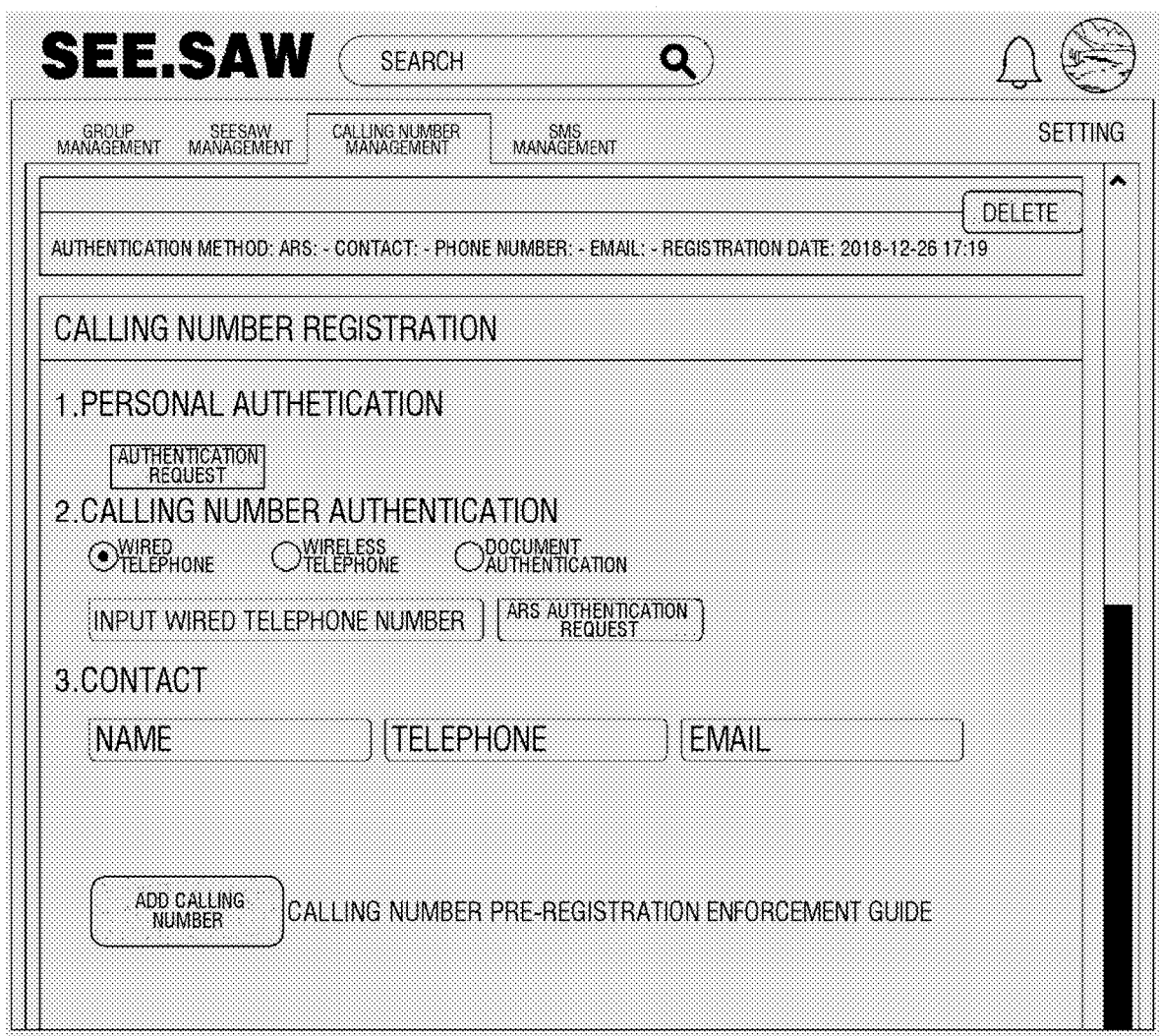
FIG. 11 schematically illustrates a display screen of a manager terminal according to the performing of a calling number setting unit according to an embodiment of the present inventive concept.

FIG. 11 schematically illustrates a display screen of a manager terminal according to the performing of a calling number setting unit 400 according to an embodiment of the present inventive concept.

The calling number setting unit 400 performs a procedure of registering a phone number used when sending an SMS in the message setting unit 620 as a calling number, which will be described later. The telephone number registered as the calling number set in the calling number setting unit 400 is used to display to receive a selection input from a manager terminal when the second group setting unit 300 sets the calling number selection item. As shown in FIG. 11, the calling number setting unit 400 first performs personal authentication step. When a manger clicks on the authentication request button through the manger terminal, an interface to proceed personal authentication is provided and personal authentication is performed. After performing personal authentication of the manager, the calling number setting unit 400 performs calling number authentication. As illustrated in FIG. 11, a manger may perform the calling number authentication by selecting any one of a wired telephone, a wireless telephone and document authentication. The calling number setting unit 400 performs calling number authentication by providing an interface for receiving a calling number authentication selection input from the manager terminal and performing calling number authentication with the manager terminal. In the case of wired telephone authentication, as shown in FIG. 11, upon receiving an input of a wired telephone number and an ARS authentication request from the manager terminal, authentication is performed by calling to the received wired telephone number to perform authentication. In the case of wireless phone authentication, upon receiving an input of a wireless phone number and an SMS authentication request from the manager terminal, the calling number setting unit 400 generates an authentication number using the received wireless phone number, sends it to the wireless phone number and determines whether the number received from the wireless telephone is the same as the authentication number to perform wireless telephone authentication. In the case of document authentication, an input of a wired or wireless telephone number that can be contacted is received from the manager terminal, and a calling number registration request form is provided to the manager terminal. And, the manager downloads the calling number registration request form provided by the calling number setting unit 400 and upload it after filling out. The calling number setting unit 400 may perform document authentication by receiving the written calling number registration request form. Then, the manager may input a name, telephone number and email of the person in charge as shown in FIG. 11, and when the Add calling number button is clicked, the calling number setting unit 400 performs registration of the calling number.

Preferably, the calling number can be set by the calling number setting unit 400 is not only a phone number of a manager terminal, but can be a phone number of another user terminal, to which an SMS is to be sent.

Figure 12:
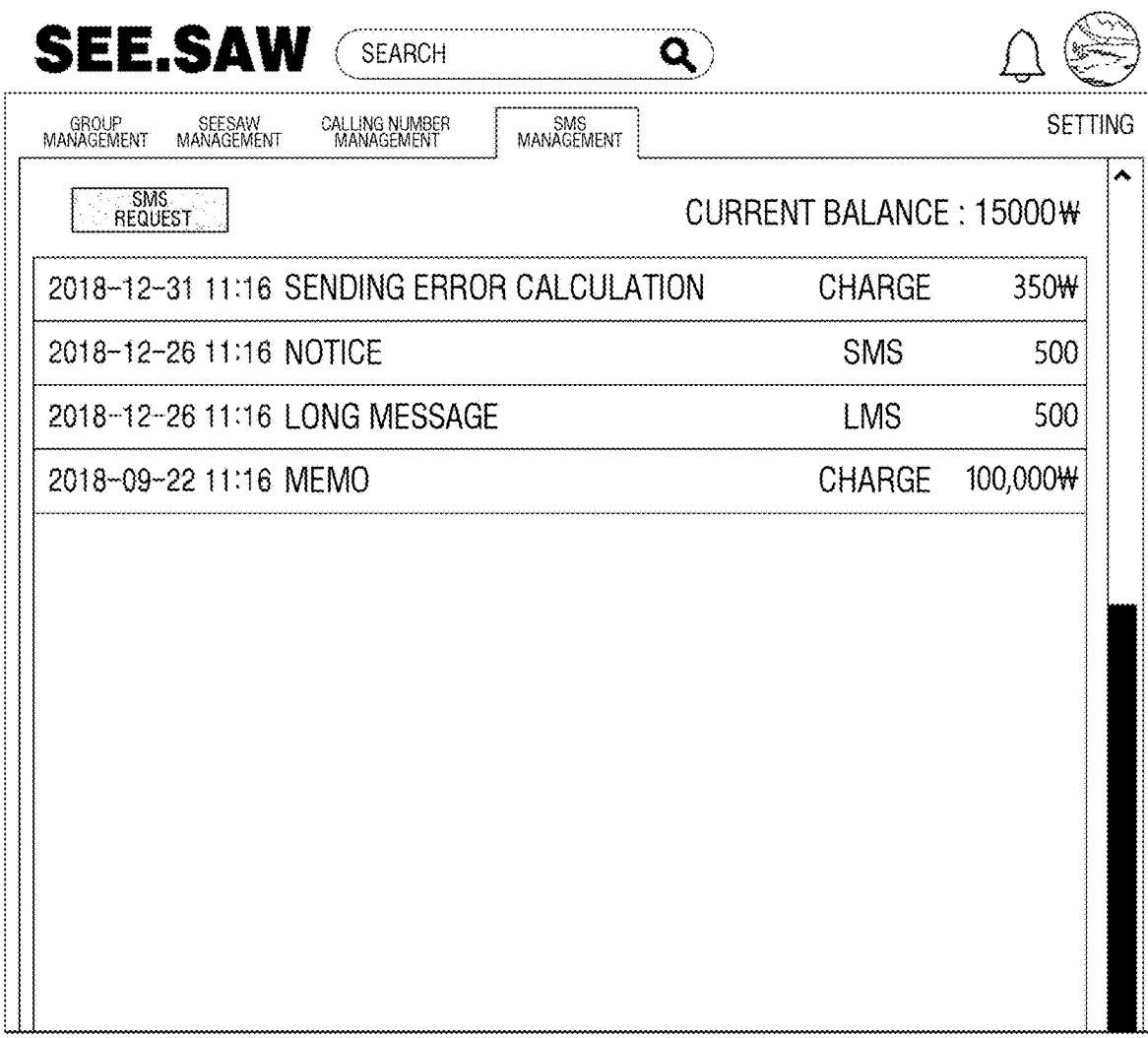
FIG. 12 schematically illustrates a display screen of a manager terminal according to the performing of an SMS setting unit according to an embodiment of the present inventive concept.

FIG. 12 schematically illustrates a display screen of a manager terminal according to the performing of the SMS setting unit 500 according to an embodiment of the present inventive concept.

Specifically, the SMS setting unit 500 provides a manager terminal with an interface for charging a necessary amount when sending an SMS to the user terminal and an interface for checking information on the used SMS. As shown in FIG. 12, when a manager clicks the SMS charging button, the manger may charge the SMS sending amount and check the current balance of the SMS sending amount remaining in the current account of the manager. Further, it is possible to check the information on the SMS, including the previous charging history of the SMS sending amount. SMS sending history and SMS usage.

Figure 13:
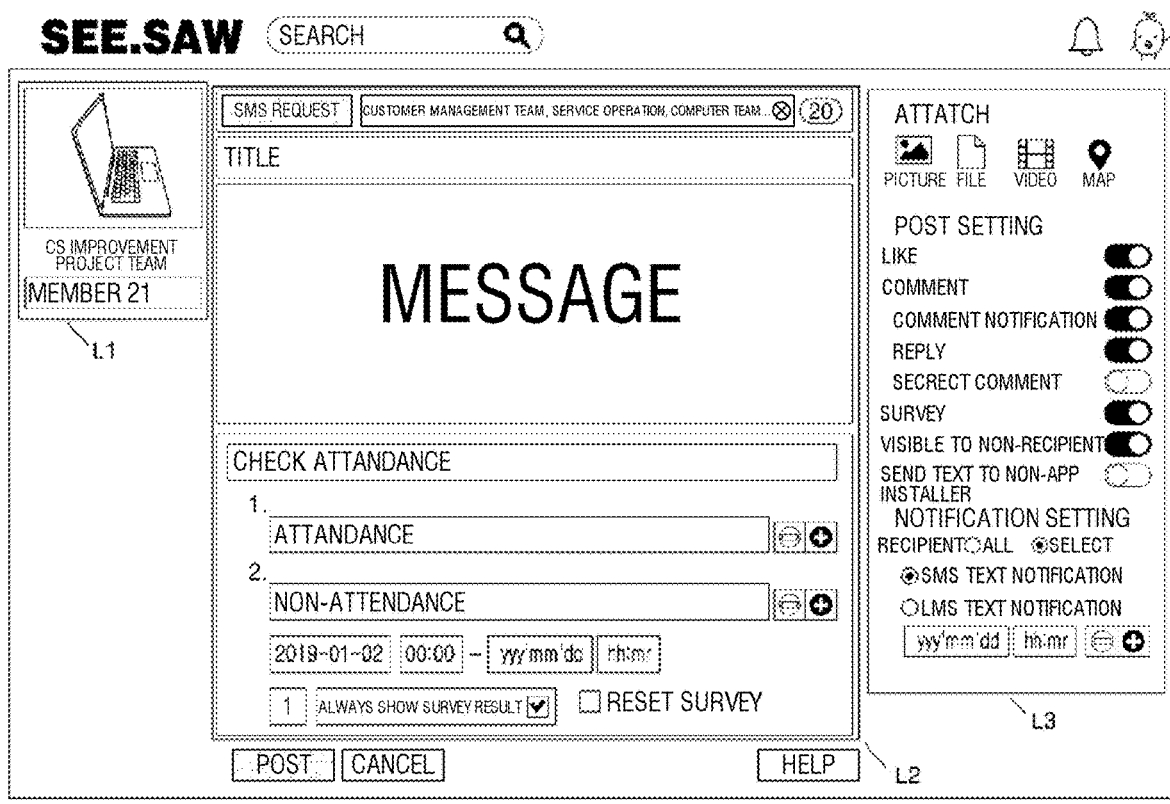
FIG. 13 schematically illustrates a display screen of a manager terminal according to the performing of a message setting unit according to an embodiment of the present inventive concept.

FIG. 13 schematically illustrates a display screen of a manager terminal according to the performing of the message setting unit 620 according to an embodiment of the present inventive concept.

The message setting unit 620 may provide the manager terminal with a screen including various message information according to an input from the manager terminal. The screen in the manager terminal provided by the message setting unit 620 may include a first screen (screen of FIG. 13) for displaying an element for setting a message to be sent to a user terminal belonging to the selected second group and a second screen (screen of FIG. 16) for displaying a message sent to a user terminal along with one or more previously sent messages.

FIG. 13 corresponds to the first screen, in which the message setting unit 620 displays an element for setting a message to be sent to a user terminal according to an input from a manager terminal.

The display element in the manager terminal provided by the message setting step includes: a group display layer (L1) indicating the second group for sending the message; a text input layer (L2) for inputting the message text; and a message setting layer (L3) for setting details on the message.

In the group display layer L1, second group information set by the second group setting unit 300 is displayed. Specifically, the group display image of the second group for sending a message, which receives a selection input from a manager terminal, the seesaw name, which is the name of the second group, and the number of second group members are displayed.

In the text input layer L2, an interface for inputting text into the manager terminal is displayed so that at least one of a message text or an attached image inputted by the manager terminal can be received. Further, the interface for details of a message set in the message setting layer (L3) can be displayed. For example, when setting an attached file, an attached video, an attached map and a survey, an interface for the set details is displayed.

In the message setting layer L3, an interface for setting details on message information including at least one of a message text and an attached image inputted by the manager terminal is displayed. As shown in FIG. 13, an image, a file, a video and a map may be attached, and whether to receive a comment or a like on a message may be set. A message for conducting a survey to users belonging to the second group can be set, and whether to disclose and notify the message can be set.

Preferably, when the manager sets a recipient of a notification setting to 'select' in the detail setting of the message after selecting the second group, clustered information may be provided based on a member list and a member classification item belonging to the second group, in which a message sending member condition can be further set within a member range of the second group, and the message sending member condition may be selected and set based on the clustered information.

Figure 14:
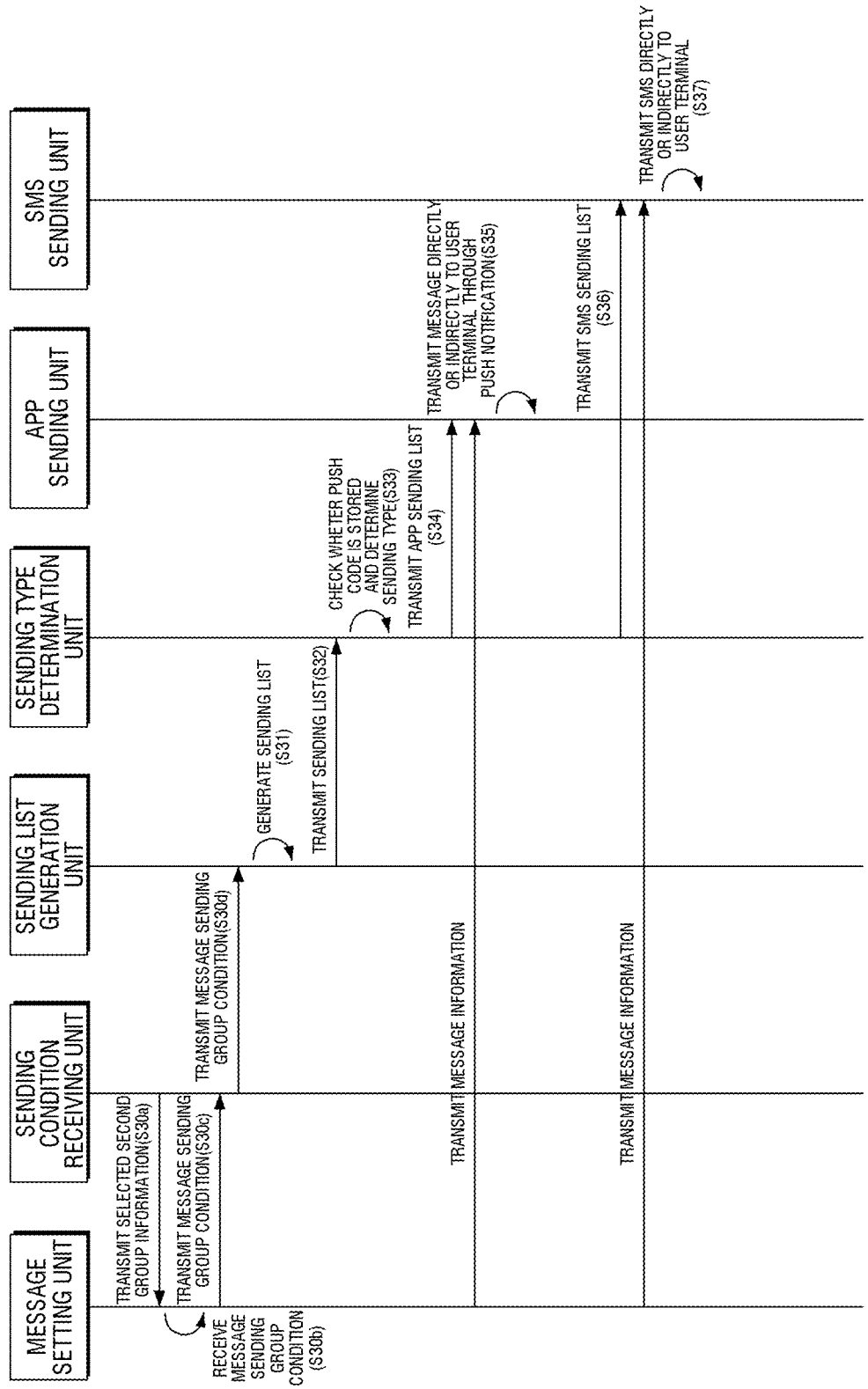
FIG. 14 schematically illustrates an operation of a message sending unit according to an embodiment of the present inventive concept.

FIG. 14 schematically illustrates an operation of the message sending unit 600 according to an embodiment of the present inventive concept.

As described above, the message sending unit 600 of the service server 1000 includes a sending condition receiving unit 610; a message setting unit 620; a sending list generation unit 630; a sending type determination unit 640; an APP sending unit 650; a sending confirmation unit 660; and an SMS sending unit 670.

The message sending unit 600 may send a message to a user terminal through a push notification through a dedicated application or an SMS.

As shown in FIG. 10, when a screen, in which a second group list is displayed in a manager terminal by the second group setting unit 300, is provided, the sending condition receiving unit 610 receives a selection input for two groups, to which a message is to be sent from the manager terminal. Preferably, a selection for the second group is included in a group member condition.

Then, a message setting request input is received to the selected second group, and an interface for setting a message is provided to a manager terminal to receive message information including at least one of a message text and an attached image, and a message is sent directly or indirectly to a user terminal belonging to the second group.

Specifically, at step S30a, the sending condition receiving unit 610 receives a selection input for the second group from the manager terminal and transmits the selected second group information to the message setting unit 620.

At step S30b, the message setting unit 620 provides clustered information on the basis of a member classification item based on the second group information received from the sending condition receiving unit 610 to the manager terminal and receives a message member sending condition from the manager terminal.

Preferably, the message sending member condition received from the manager terminal based on the selection for the second group and clustered information is included in the group member condition.

At step S30c, the message setting unit 620 sends the group member condition, to which a message is to be sent, among the received second group, to the sending condition receiving unit 610.

At step S30d, the sending condition receiving unit 610 transmits the group member condition to the sending list generation unit 630.

Further, the message setting unit 620 transmits message information received from the manager terminal to the APP sending unit 650 and the SMS sending unit 670.

At step S31, the sending list generation unit 630 generates a sending list of a user terminal, to which a message is to be sent, based on the group member condition received from the sending condition receiving unit 610. The sending list corresponds to a list of telephone numbers of group members, to which a message is to be sent.

At step S32, the sending list generation unit 630 transmits the generated sending list to the sending type determination unit 640.

At step S33, the sending type determination unit 640 determines a push code is stored based on the sending list received from the sending list generation unit 630, and determines a message sending type.

Preferably, the push code refers to a code, with which the service server 1000 may identify a user terminal and transmit a push notification to the user terminal through communication with an APP management server 2000 to be described later. A push code of a user terminal connected to the service server 1000 is stored in push code information of the DB 700 of the service server 1000.

Preferably, the sending type determination unit 640 determines whether a push code of a corresponding telephone number is stored in the push code information based on the telephone number of the received sending list. When the push code corresponding to the telephone number of the user terminal is stored in the push code information, the message sending type is determined as APP sending, and an APP sending list is generated. When the push code corresponding to the telephone number of the user terminal is not stored in the push code information, the message sending type is determined as SMS sending, and an SMS sending list is generated. The APP sending list and the SMS sending list correspond to a list of phone numbers of group members, to which a message is to be sent.

Preferably, the process of determining whether the push code is stored at step S33 may correspond to step S46 in FIG. 15 to be described later.

At step S34, the sending type determination unit 640 transmits the generated APP sending list to the APP sending unit 650.

At step S35, the APP sending unit 650 sends a message directly or indirectly to a user terminal through a push notification based on message information received from the message setting unit 620 and an APP sending list received from the sending type determining unit 640.

Preferably, step S35 may correspond to steps S47 and S48 in FIG. 15 to be described later.

At step S36, the sending type determination unit 640 transmits the generated SMS sending list to the SMS sending unit 670.

At step S37, the SMS sending unit 670 sends an SMS directly or indirectly to a user terminal based on message information received from the message setting unit 620 and an SMS sending list received from the sending type determining unit 640.

Upon completion of the performing of the message sending unit 600, a user terminal belonging to the sending condition group may receive a push notification or an SMS type message.

A screen, in which the message information is displayed in the manager terminal, may include one or more layers of a screen displayed by the message setting unit 620 described with reference to FIG. 13 or 17 or a layer corresponding to the one or more layers.

Figure 15:
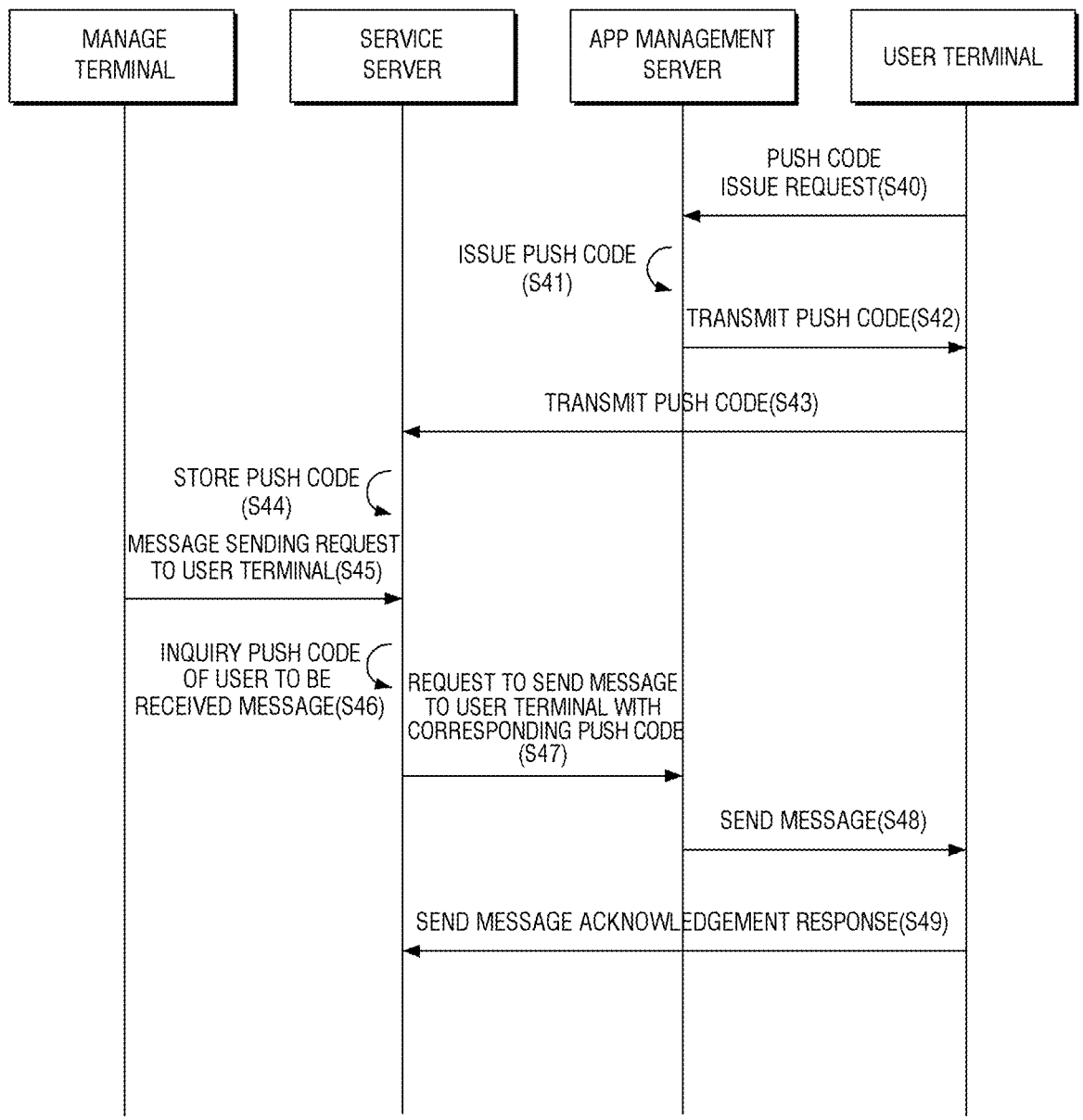
FIG. 15 illustrates an overall process for sending a message through push notification according to an embodiment of the present inventive concept.

FIG. 15 illustrates an overall process for sending a message through a push notification according to an embodiment of the present inventive concept.

The service server 1000 may not be capable of direct data transmission and system access to a manager terminal or a user terminal due to personal information protection. Therefore, when the service server 1000 transmits data through a dedicated application, the service server 1000 may communicate with the APP management server 2000 to transmit data to the user terminal described above.

Specifically, FIG. 15 illustrates an overall process for sending a message through a push notification in a service server 1000 that directly or indirectly performs data communication with a manager terminal, a user terminal and an APP management server 2000.

Specifically, at step S40, the user terminal requests the issuance of a push code to the APP management server 2000 in the process of accessing the service server 1000 by performing device authentication through a dedicated application.

At step S41, the APP management server 2000, which receives the request for issuing a push code from the user terminal, issues a push code for identifying the user terminal. At step S42, the APP management server 2000 transmits the issued push code to the corresponding user terminal. At step S43, the user terminal transmits the push code received from the APP management server 2000 to the service server 1000. At step S44, the service server 1000 receives the push code from the user terminal, and stores the received push code and the telephone number of the user terminal in the push code information included in the DB 700 of the service server 1000. The push code information stored in the DB 700 may be represented as shown in Table 3 below.

TABLE 3

| Phone Number | Push code |
| --- | --- |
| 01012345678 | APA91bEZ3fjwrKV2mxAFvZMC960zKBWBV |
| 01010002000 | AWA58bPS5reryOP3qwPOxPAC345zSKDFJ |

TABLE 3-continued

| Phone Number | Push code |
| --- | --- |
| 01010002001 | AQA45dIO3wegjSL5gfAHcUID324dDJKSD |
| 01010002002 | AGA25dKD1sdghWQ7dsSDrDSA557eDJKJD |
| 01010002003 | ASA14bAO8werfDF3xcCXoDFD975fIWUAA |
| 01010002004 | ABA08qDK2dgsdZX5asZMkSDW214hOEJDK |
| 01010002005 | ANA01pDJ3asdfZQ4zxEPgASR953kPQWJD |
| 01010002006 | AVA04eBN4tybhOD1weAJnSDS346uOJSND |
| 01010002007 | AIA35aSK1dsdqAN7dsVAmDFD367tUWEHR |
| 01010002008 | AMA94tNE6pmmiFD9swFGpSDG838yKEJHR |

Preferably, the push code information stored in the service server 1000 has various character lengths or character forms of push codes, which may be different according to each of APP management server 2000 or a user terminal, as shown in Table 3. And, not only the push code form shown in Table 3, but all push code forms may be used.

At step S45, the manager terminal requests the service server 1000 to transmit a message through a push notification to a user terminal. At step S46, the service server 1000 receives a request for transmitting a message from the manager terminal and inquiries about a push code of a user, who will receive the message, from the push code information stored in the service server 1000. Preferably, step S46 may correspond to step S33 of FIG. 14. At step S47, the service server 1000 requests the APP management server 2000 to transmit a message to the user terminal having the push code inquired at step S46. At step S48, the APP management server 2000 performs message transmission through a push notification to the user terminal matching the push code based on the received push code information. Preferably, steps S47 and S48 may correspond to step S35 of FIG. 14. At step S49, the user terminal receiving the message transmits a message acknowledgment response to the service server 1000.

Figure 16:
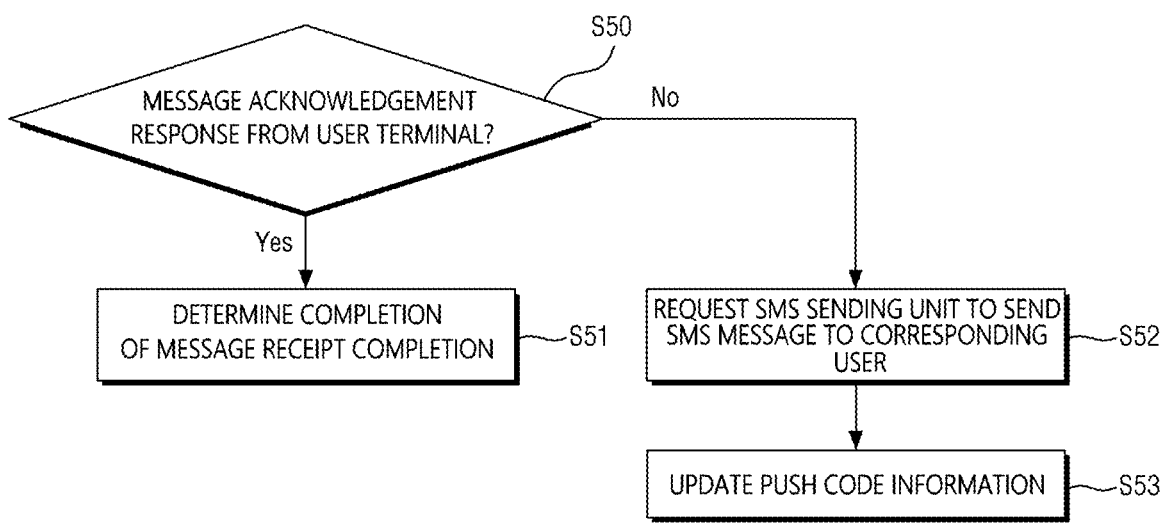
FIG. 16 schematically illustrates performing steps of a sending confirmation unit according to an embodiment of the present inventive concept.

FIG. 16 schematically illustrates performing steps of a sending confirmation unit 660 according to an embodiment of the present inventive concept.

The message sending unit 600 of the service server 1000 further includes the sending confirmation unit 660, wherein the sending confirmation unit 660 performs step S50 of determining whether a user terminal has sent an acknowledgment response to the message sent by the APP sending unit 650; step S51 of determining whether the message sending has completed when receiving the acknowledgment response; step S52 of requesting the SMS sending unit 670 to send an SMS to the corresponding user terminal when not receiving the acknowledgment response; and step S53 of updating the push code information stored in the service server 1000.

Specifically, at step S50, the user terminal sends an acknowledgment response that can confirm receipt of the message sent through a push notification from the APP sending unit 650 to the sending confirmation unit 660, and the sending confirmation unit 660 determines whether the acknowledgment response of the user terminal has been received.

Step S51 is performed when the acknowledgment response is received from the user terminal at step S50. At step S51, the sending confirmation unit 660 determines the message sent to the corresponding user terminal as the completion of message sending.

Step S52 is performed when the acknowledgment response has not been received from the user terminal at step S51. At step S52, the sending confirmation unit 660 sends an SMS sending request of the message tried to send to the corresponding user terminal through a push notification to the SMS sending unit 670.

At step S53, after step S52 is performed, the sending confirmation unit 660 updates the push code information stored in the service server 1000.

Preferably, the user terminal that has not received the acknowledgment response is determined that it cannot receive a push notification through a dedicated application, and the telephone number and push code of the corresponding user terminal is deleted from the push code information stored in the service server 1000.

DB 700 that can more accurately distinguish between a user terminal, to which a message is transmitted by a push notification, and a user terminal, to which a message is transmitted by an SMS, can be built by the operation of the sending confirmation unit 660 of updating the push code information each time a message is sent.

Figure 17:
FIG. 17 schematically illustrates a display screen of a manager terminal according to the performing of a message setting unit according to an embodiment of the present inventive concept.

FIG. 17 schematically illustrates a display screen of a manager terminal according to the performing of a message setting unit 620 according to an embodiment of the present inventive concept.

The message setting unit 620 may provide the manager terminal with a screen including various message information according to an input from the manager terminal. The screen in the manager terminal provided by the message setting unit 620 may include a first screen for displaying an element for setting a message to be sent to a user terminal belonging to the selected second group (screen of FIG. 13) and a second screen for displaying a message sent to the manager terminal along with one or more previously sent messages (screen of FIG. 16).

FIG. 17 corresponds to the second screen, in which a message sent to a user terminal is displayed in the manager terminal along with one or more previously sent messages after the message setting unit 620 completes the setting of a message according to an input from the manager terminal.

Display elements in the manager terminal provided by the message setting step includes: a group display layer (L1) indicating the second group for sending the message; a previous message display layer (LA) for displaying one or more previously sent messages; and a communication layer (L5) for inputting a comment or a like on one or more user terminals belonging to the second group.

In the group display layer L1, the second group information set by the second group setting unit 300 is displayed. Specifically, the group display image of the second group for sending a message receiving a selection input from the manager terminal, the seesaw name, which is the name of the second group, and the number of second group members are displayed.

In the previous message display layer L4, the most recently sent message by the manager from the manager terminal is displayed at the top of the previous message display layer L4, and one or more previously sent messages are displayed together. Further, the previous message display layer (L4) may include the communication layer (L5).

In the communication layer (L5), a comment or like to the message sent from the manager terminal may be inputted at one or more user terminals belonging to the second group, and a comment or a like, which is inputted from the user terminal, is received and displayed on the communication layer (L5). In the communication layer (L5), opinions from one or more user terminals belonging to the second group may be shared with each other, and thus, users in the same group may have simple and fast communication.

FIGS. 18A and 18B schematically illustrate a display screen of a user terminal connected to the service server 1000 according to an embodiment of the present inventive concept.

Specifically, FIGS. 18A and 18B illustrate a screen for confirming a message received at a user terminal connected to the service server 1000 and a writing screen of a user terminal having writing permission.

FIG. 18A corresponds to a screen of a user terminal for checking a message set and sent by the manager terminal of FIG. 13. It is shown that the detail settings for the message, such as a message text and a survey, are displayed in the same way as the screen displayed in the manager terminal.

FIG. 18B corresponds to a screen, in which a user terminal that has been granted writing permission by a manager is provided by the service server 1000 with an interface to write a message. As shown in FIG. 18B, a title and content can be written, and an image can be attached. Whether to receive a comment or a like for a message can also be set.

FIGS. 19A to 19D schematically illustrate a display screen of a user terminal connected to a service server 1000 according to an embodiment of the present inventive concept.

Specifically. FIGS. 19A to 19D illustrate a screen of a user terminal connected to the service server 1000 for receiving a push notification and a screen for setting its account of the user terminal.

Figures 19A, 19B, 19C, 19D:
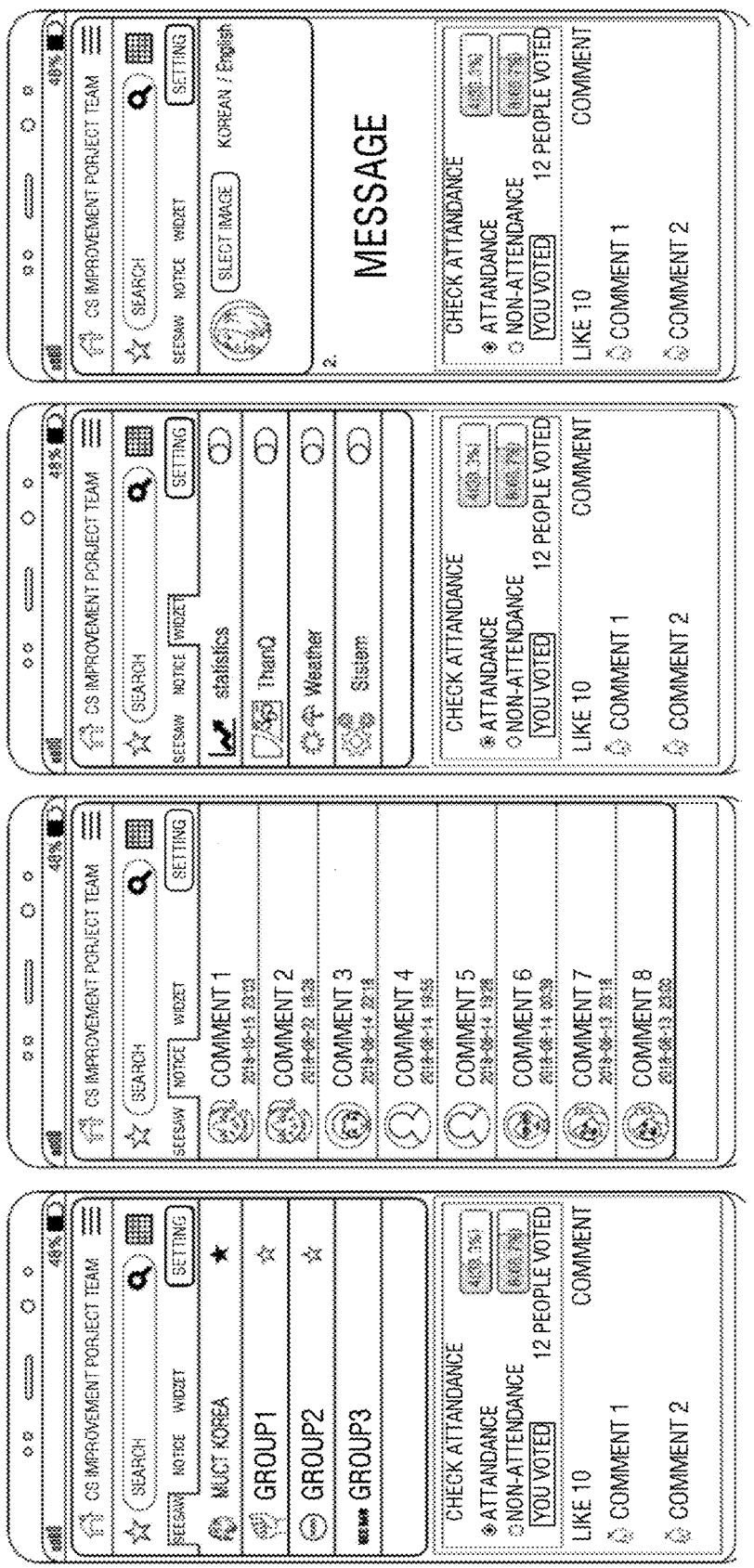
FIGS. 19A to 19D schematically illustrate a display screen of a user terminal connected to a service server according to an embodiment of the present inventive concept.

FIG. 19A corresponds to a screen showing a second group list, to which a user terminal currently belongs. The user may check the second group list, to which the user belongs, through a dedicated application connected to the service server 1000 as shown in FIG. 19A.

FIG. 19B corresponds to a screen for receiving a push notification for a message, a comment or a like that can be checked in the second group, to which the user terminal belongs. A comment or a like on its post from other user terminals can be received, or a notification, such as the posting of a new message, can be received.

FIG. 19C corresponds to a screen, in which an interface for setting a widget in a user terminal is provided from the service server. The widget may set whether to expose it on the main page according to a user's selection. For example, widgets, such as statistics, weather, or system settings, can be set. Preferably, according to the used second group, the manager managing the second group may be provided with a widget service having a form or content different from the widget, and the widget may be set in the user terminal based on the provided widget service.

FIG. 19D corresponds to a screen, in which an interface for setting an environment of an account of a user terminal is provided. The user can select and set a representative image that can represent his or her account, and set the language of the user terminal to Korean or English.

The concepts of the invention described above can be embodied as computer-readable code on a computer-readable medium. The computer-readable medium may be, for example, a removable recording medium or a fixed recording medium.

According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for providing a group communication service performed in a service server for performing data communication with a manager terminal and a user terminal, the method comprising:
   a first group setting step of setting a first group by providing an interface for receiving group member information from a manager terminal and setting a member classification item;
   a second group setting step of setting a second group by providing an interface for providing a clustered information on the basis of the member classification item based on information on the first group and receiving a manager input for the clustered information; and
   a message sending step of receiving message information sent according to an input of a manager terminal and sending a message to a user terminal belonging to the second group,
   wherein the user terminal can check the message with a dedicated application by installing the dedicated application for the group communication service even if the user terminal is not a member of the service server.

2. The method for providing a group communication service of claim 1, further comprising:
   a login step of performing a login procedure of a corresponding user by accessing a web browser or a dedicated application from the user terminal or a manager terminal,
   wherein the login step, in case of login of a manager terminal, performs the login procedure by receiving a phone number of a manager terminal, generating an authentication number with the phone number and sending the authentication number to the phone number, determining whether a number received from the manager terminal is the same as the authentication number,
   wherein the login step, in case of login of a user terminal, performs the login procedure by authenticating a device through the dedicated application.

3. The method for providing a group communication service of claim 1,
   wherein the first group setting step comprising:
   setting first group basic information including the member classification item;
   receiving a previously stored group member information list file from a manager terminal; and
   generating first group information based on the member classification item and the group member information list file.

4. The method for providing a group communication service of claim 3,
   wherein the second group setting step comprising:
   setting second group basic information;
   receiving a selection input for at least one of at least one first group information from a manager terminal;
   providing information, in which the selected first group information is clustered based on the member classification item, to a manager terminal;
   receiving an input for a group member condition from a manager terminal; and generating second group information based on the first group information and the group member condition.

5. The method for providing a group communication service of claim 1,
wherein the message sending step comprising:
a sending condition receiving step of receiving a group member condition for sending the message among at least one the second group from a manager terminal;
a message setting step of receiving the message information from a manager terminal and displaying a screen including the message information in a manager terminal;
a sending list generation step of generating a sending list based on a group member condition for sending the received message information;
a sending type determination step of determining whether to send the message in the type of push notification through a dedicated application or SMS based on push code information per user terminal stored in the service server and the sending list;
an APP sending step of sending the message through the push notification directly or indirectly to a user terminal according to the determined sending type; and
an SMS sending step of sending the message with the SMS directly or indirectly to a user terminal according to the determined sending type.

6. The method for providing a group communication service of claim 5,
wherein a display element in the manager terminal provided by the message setting step comprising:
a group display layer for displaying information on the second group, to which the message is to be sent;
a text input layer for inputting the message text; and
a message setting layer for setting details of the message.

7. The method for providing a group communication service of claim 5,
wherein a display element in a manager terminal provided by the message setting step comprising:
a group display layer for indicating the second group, to which the message can be sent;
a previous message display layer for displaying one or more previously sent messages; and
a communication layer for inputting a comment or a like in one or more user terminals belonging to the second group.

8. The method for providing a group communication service of claim 5,
wherein the message sending step further comprises a sending confirmation step,
wherein the sending confirmation step comprising:
determining whether there is an acknowledgment response of a user terminal for a message sent by the APP sending unit;
determining completion of message sending when an acknowledgment response is received;
requesting an SMS sending unit to send an SMS to a corresponding user terminal when an acknowledgment response is not received; and
updating a push code information stored in the service server.

9. A system for providing a group communication service implemented by a service server for performing data communication with a manager terminal and a user terminal, the system comprising:
a first group setting unit of setting a first group by providing an interface for receiving group member information from a manager terminal and setting a member classification item;
a second group setting unit of setting a second group by providing an interface for providing a clustered information on the basis of the member classification item based on information on the first group and receiving a manager input for the clustered information; and
a message sending unit of receiving message information sent according to an input of a manager terminal and sending a message to a user terminal belonging to the second group,
wherein the user terminal can check the message with a dedicated application by installing the dedicated application for the group communication service even if the user terminal is not a member of the service server.

10. The system for providing a group communication service of claim 9, further comprising:
a login unit of performing a login procedure of a corresponding user by accessing a web browser or a dedicated application from the user terminal or a manager terminal,
wherein the login unit, in case of login of a manager terminal, performs the login procedure by receiving a phone number of a manager terminal, generating an authentication number with the phone number and sending the authentication number to the phone number, determining whether a number received from the manager terminal is the same as the authentication number,
wherein the login unit, in case of login of a user terminal, performs the login procedure by authenticating a device through the dedicated application.

11. The system for providing a group communication service of claim 9,
wherein the first group setting unit is configured to:
set first group basic information including the member classification item,
receive a previously stored group member information list file from a manager terminal, and
generate first group information based on the member classification item and the group member information list file.

12. The system for providing a group communication service of claim 9,
wherein the message sending unit comprising:
a sending condition receiving unit of receiving a group member condition for sending the message among at least one the second group from a manager terminal;
a message setting unit of receiving the message information from a manager terminal and displaying a screen including the message information in a manager terminal;
a sending list generation unit of generating a sending list based on a group member condition for sending the received message information;
a sending type determination unit of determining whether to send the message in the type of push notification through a dedicated application or SMS based on push code information per user terminal stored in the service server and the sending list;
an APP sending unit of sending the message through the push notification directly or indirectly to a user terminal according to the determined sending type; and
an SMS sending unit of sending the message with the SMS directly or indirectly to a user terminal according to the determined sending type.

13. A computer-readable recording medium having recorded thereon a program for performing a method for providing a group communication service according to claim 1.

* * * * *